US 9,850,967 B2

(12) United States Patent
Gerber et al.

(10) Patent No.: US 9,850,967 B2
(45) Date of Patent: Dec. 26, 2017

(54) BRAKE CALIPER GUIDE PIN LOW PRESSURE ISOLATION DAMPER

(71) Applicant: Kelsey-Hayes Company, Livonia, MI (US)

(72) Inventors: Kraig E. Gerber, Plymouth, MI (US); Antonio Eduardo De Morais, South Lyons, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 14/992,430

(22) Filed: Jan. 11, 2016

(65) Prior Publication Data

US 2017/0198771 A1    Jul. 13, 2017

(51) Int. Cl.
*F16D 65/02*    (2006.01)
*F16D 65/00*    (2006.01)
*F16D 55/2265*    (2006.01)

(52) U.S. Cl.
CPC ..... *F16D 65/0006* (2013.01); *F16D 55/22655* (2013.01)

(58) Field of Classification Search
CPC .............. F16D 55/2262; F16D 55/2265; F16D 55/227; F16D 65/0062
USPC .......................................... 188/73.43–73.45
See application file for complete search history.

(56) References Cited

U.S. PATENT DOCUMENTS

| | | | |
|---|---|---|---|
| 4,084,665 A * | 4/1978 | Burnett | F16D 55/2262 188/73.45 |
| 4,310,075 A * | 1/1982 | Johannesen | F16D 55/2262 188/73.33 |
| 4,313,526 A * | 2/1982 | Farr | F16D 55/22655 188/72.4 |
| 4,446,948 A | 5/1984 | Melinat | |
| 6,026,938 A * | 2/2000 | Demoise, Jr. | F16D 55/22655 188/73.35 |
| 6,397,983 B1 | 6/2002 | Roszman et al. | |
| 9,587,686 B2 * | 3/2017 | Morais | F16D 55/227 |
| 2012/0234635 A1 | 9/2012 | Wake et al. | |
| 2014/0116817 A1 | 5/2014 | Morais et al. | |
| 2014/0231191 A1 | 8/2014 | Morais et al. | |

FOREIGN PATENT DOCUMENTS

| | | |
|---|---|---|
| JP | 07197962 A | 8/1995 |
| JP | 2012072842 A | 4/2012 |

OTHER PUBLICATIONS

PCT International Search Report and Written Opinion, Application No. PCT/US2017/012663, dated Apr. 27, 2017.

* cited by examiner

*Primary Examiner* — Christopher Schwartz
(74) *Attorney, Agent, or Firm* — MacMillan, Sobanski & Todd, LLC

(57) ABSTRACT

A disc brake assembly comprises an anchor bracket, a guide pin, a main damper, and an isolation damper. The anchor bracket has a bore. The guide pin is slidably supported in the bore and has a stem. The main damper is between the stem and an interior surface of the bore. The isolation damper is also between the stem and the interior surface. The isolation damper limits contact between the stem and the interior surface.

17 Claims, 3 Drawing Sheets

BRAKE CALIPER GUIDE PIN LOW PRESSURE ISOLATION DAMPER

BACKGROUND OF INVENTION

This invention relates in general to vehicle disc brake assemblies and in particular to a guide pin isolation damper adapted for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

Typical disc brake assemblies include a rotor which is secured to the wheel of the vehicle for rotation therewith. The rotor includes a pair of opposed friction plates which are selectively engaged by portions of a caliper assembly. The caliper is slidably supported on an anchor bracket by guide pins. The guide pins are secured to the caliper by guide pin fasteners and extend into bores of the anchor brackets. The guide pins contact the anchor bracket at contact points in the bores and create a contact load on each of the guide pins at the contact points.

The anchor bracket is attached to a non-rotatable component of the vehicle, such as the vehicle frame. The caliper assembly includes a pair of brake shoes which are disposed on opposite sides of the brake rotor. The brake shoes are connected to one or more hydraulically or pneumatically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The anchor bracket bores have a greater diameter than the guide pins. The guide pins have a clearance between an exterior surface of the guide pin and an interior surface of the bore such that the guide pins may move within the bores. As disclosed in U.S. Patent Publication No. 2014/0116817 to Morais et al., the disclosure of which is incorporated herein by reference in entirety, a damper may be provided on the guide pins to provide a defined point of contact between the guide pins and bores when a brake loading is applied to the disc brake assembly. However, a guide pin with a defined contact point may still contact or strike the interior surface of the bore and produce noise, vibration, or harshness when there is no brake loading or a low pressure brake loading. Thus, it would be desirable to reduce or control metal on metal contact between the guide pins and the interior surface of the bores.

SUMMARY OF INVENTION

This invention relates to a brake caliper guide pin having an isolation damper and for use in a vehicle disc brake assembly.

According to one embodiment, a disc brake assembly may comprise, individually and/or in combination, one or more of the following features: an anchor bracket, a guide pin, a main damper, and an isolation damper. The anchor bracket has a bore. The guide pin is slidably supported in the bore and has a stem. The main damper is between the stem and an interior surface of the bore. The isolation damper is also between the stem and the interior surface. The isolation damper limits contact between the stem and the interior surface.

According to another embodiment, a disc brake assembly may comprise, individually and/or in combination, one or more of the following features: an anchor bracket, a guide pin, a main damper, an isolation damper, and a clearance. The anchor bracket has a bore. The guide pin is slidably supported in the bore and has a stem. The main damper is between the stem and an interior surface of the bore. The isolation damper is also between the stem and the interior surface. As a brake loading on the brake assembly increases, the isolation damper is compressed until the clearance is closed and the stem contacts the inner surface.

An advantage of an embodiment is reduced metal to metal contact between a guide pin and an anchor bracket bore in which the guide pin is inserted. Other advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
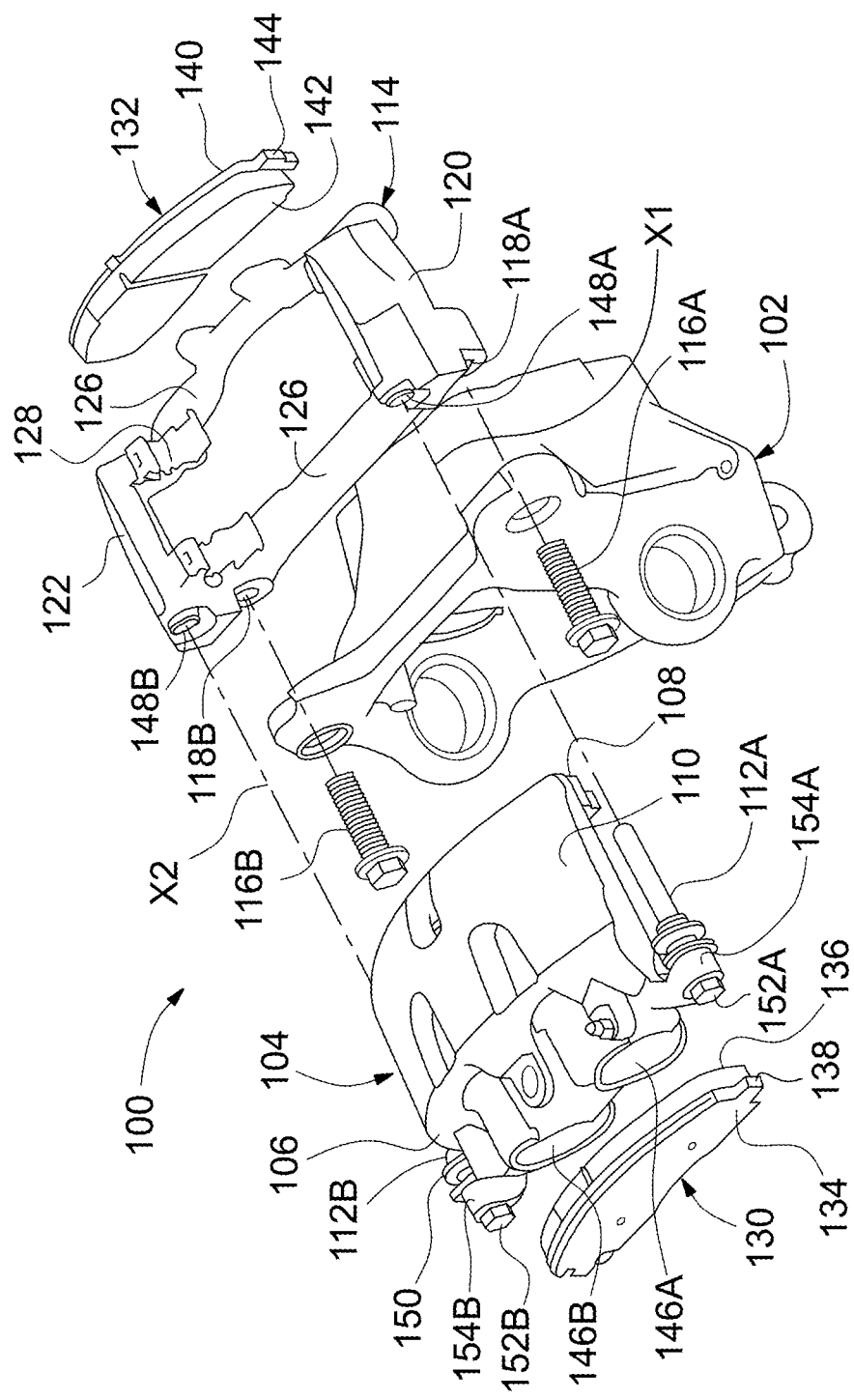
FIG. 1 is an exploded perspective view of a portion of a disc brake assembly having guide pins in accordance with a first embodiment of the present invention.

Referring now to the drawings, there is illustrated in FIG. 1, a portion of a vehicle disc brake assembly, indicated generally at 100, with a knuckle, indicated generally at 102. The general structure and operation of the disc brake assembly 100 is conventional in the art. For example, the disc brake assembly 100 may be as disclosed in U.S. Patent Publication No. 2014/0231191 to Morais et al., the disclosure of which is incorporated herein by reference in entirety. Thus, only those portions of the vehicle disc brake assembly 100 which are necessary for a full understanding of this invention will be explained and illustrated in detail. Also, although this invention will be described and illustrated in connection with the particular vehicle disc brake assembly disclosed herein, it will be appreciated that this invention may be used in connection with other vehicle disc brake assemblies, if so desired.

The disc brake assembly 100 is a pin guided or pin sliding type of disc brake assembly and includes a generally C-shaped caliper, indicated generally at 104. The caliper 104 includes an inboard leg portion 106 and an outboard leg portion 108 which are interconnected by an intermediate bridge portion 110. As will be discussed in detail, the caliper 104 is secured to first and second guide pins 112A and 112B, respectively, which are slidably supported on an anchor bracket, indicated generally at 114. The anchor bracket 114 is, in turn, secured to a stationary component of the vehicle by suitable fasteners, such as for example first and second bolts 116A and 116B, respectively, which are configured to be disposed in first and second threaded openings 118A and 118B, respectively, provided in the anchor bracket 114. Such a stationary component can be, for example, the steering knuckle 102, when the disc brake assembly 100 is installed for use on the front of the vehicle, or can be, for example, an axle flange or drum-in-hat adapter (not shown), when the disc brake assembly 100 is installed for use on the rear of the vehicle.

In the illustrated embodiment, the anchor bracket 114 includes first and second axially and outwardly extending arms 120 and 122, respectively. The first and second arms 120 and 122, respectively, are interconnected at their inboard ends by an inner tie bar 124 and are interconnected at their outboard ends by an outer tie bar 126. The first and second arms 120 and 122, respectively, each have a pair of generally C-shaped channels formed thereon and clips 128 installed in each of the channels. The clips 128 are provided to slidably support an inboard brake shoe, indicated generally at 130, and an outboard brake shoe, indicated generally at 132, thereon.

In the illustrated embodiment, the inboard brake shoe 130 includes a backing plate 134 and a friction pad 136. The inboard backing plate 134 includes opposed ends having tabs or protrusions 138 formed thereon, for supporting the inboard brake shoe 130 in the clips 128 installed in the channels of the anchor bracket 114. Alternatively, the tabs 138 may be omitted or a different bearing component known to those skilled in the art may be used. For example, pins may be used instead of the tabs 138. The outboard brake shoe 132 includes a backing plate 140 and a friction pad 142. The outboard backing plate 140 includes opposed ends having tabs or protrusions 144 formed thereon, for supporting the outboard brake shoe 132 in the clips 128 installed in the channels of the anchor bracket 114. Alternatively, the inboard brake shoe 130 can be supported on a brake piston/pistons (not shown) of the disc brake assembly 100, and/or the outboard brake shoe 132 can be supported on the outboard leg portion 108 of the caliper 104, if so desired.

An actuation means is provided for effecting the operation of the disc brake assembly 100. For the disc brake assembly 100, the actuation means includes a pair of brake pistons (not shown) each of which is disposed in a first or second counterbore or recess 146A or 146B, respectively, formed in the inboard leg 106 of the caliper 104. The actuation means may be of a suitable type known to those skilled in the art. For example, the actuation means may be hydraulic, electrical, pneumatic, or mechanical types. When the brake assembly 100 is actuated, for example by a driver or a vehicle controller, a brake loading is developed on the brake assembly 100.

As shown in FIG. 1, each of the first and second pins 112A and 112B, respectively, is disposed in a corresponding first or second non-threaded bore 148A and 148B, respectively, provided in each of the first and second arms 120 and 122, respectively, of the anchor bracket 114. The first bore 148A has a longitudinal axis X1 and the second bore 148B has a longitudinal axis X2. A boot seal 150 may be installed in each of the openings provided in the caliper 104 through which each of the first and second pins 112A and 112B, respectively, extend. A pair of first and second threaded fasteners 152A and 152B, respectively, are provided to secure the corresponding first and second pins 112A and 112B, respectively, to the caliper 104. The first and second pins 112A and 112B, respectively, slidably secure the caliper 104 to the anchor bracket 114. The first and second fasteners 152A and 152B, respectively, extend through openings provided in corresponding first and second lugs 154A and 154B, respectively, of the caliper 104 and are installed in a corresponding internally threaded bore, provided inside each pin 112A and 112B, respectively.

Figure 2:
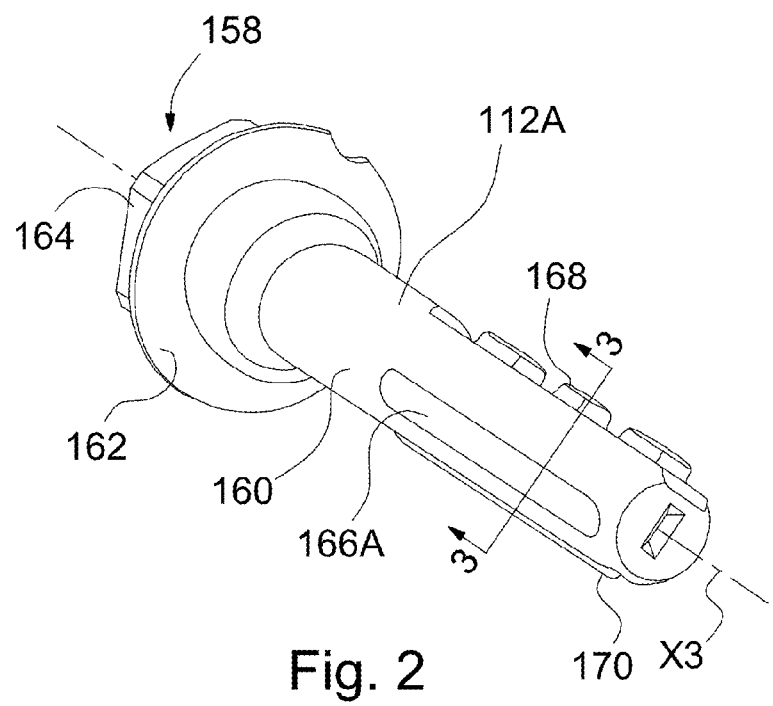
FIG. 2 is perspective view of one of the guide pins of FIG. 1.
Figure 3:
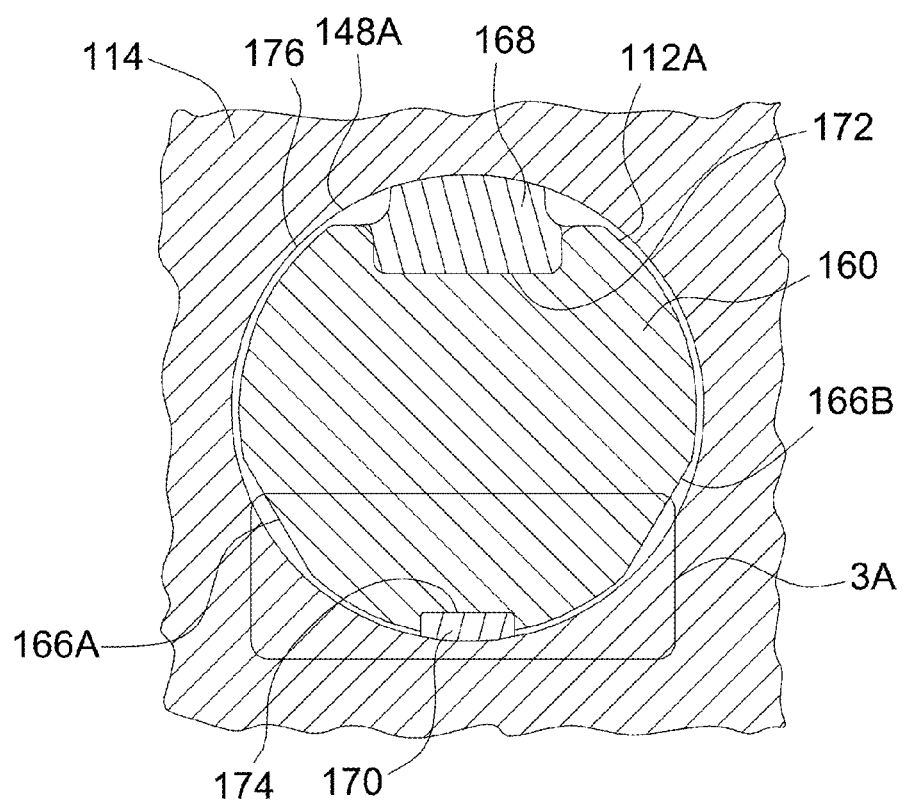
FIG. 3 is a sectional view taken along line 3-3 of FIG. 2.
Figure 3A:
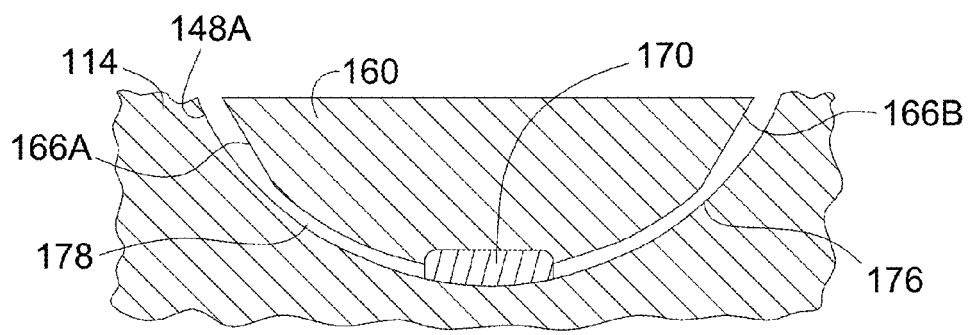
FIG. 3A is an enlarged portion of FIG. 3.
Figure 3B:
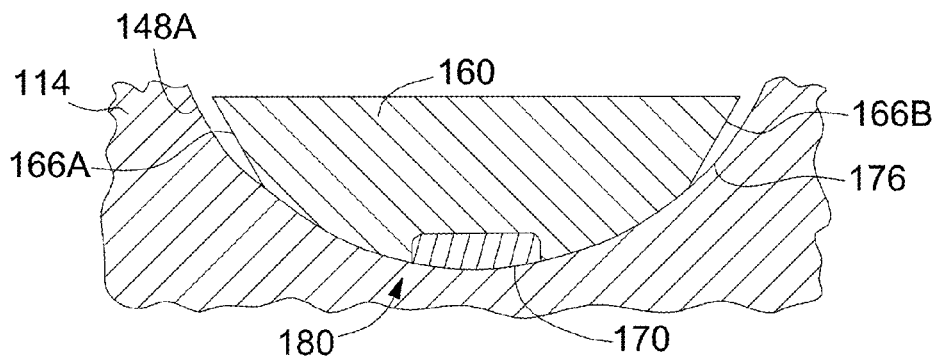
FIG. 3B is a partial sectional view of one of the guide pins of FIG. 1 in a braking position.

Referring now to FIGS. 2-3B, there is illustrated in detail the first pin 112A slidably supported in the first bore 148A. As will be readily understood by one skilled in the art, although only the first pin 112A in the first bore 148A is described and illustrated here, the second pin 112B in the second bore 148B is similarly supported.

As shown in FIG. 2, the first pin 112A includes a head portion, indicated generally at 158, a stem 160, and a longitudinal axis X3. The stem 160 extends into the first bore 148A. The head portion 158 has an enlarged flange portion 162 and a hexagonal head 164. Along a length of the stem 160 are first and second grease grooves 166A and 166B, respectively. Also along the length of the stem 160 are a main damper 168 and an isolation or secondary damper 170.

As illustrated in FIG. 3, the isolation damper 170 is a single, continuous rubber strip having a single cross sectional profile. Alternatively, the stem 160 may have more than one isolation damper 170. Alternatively, the isolation damper 170 may be comprised of individual members or pads making contact with the first bore 148A and/or have multiple cross sectional profiles.

As illustrated, the main damper 168 and isolation damper 170 are parallel. Alternatively, the main damper 168 and isolation damper 170 may be other than parallel.

As illustrated, the main damper 168 and isolation damper 170 are on opposite longitudinal sides of the stem 160—i.e., at 12 o'clock and 6 o'clock positions, respectively. Alternatively, the main damper 168 and isolation damper 170 may be on other than opposite longitudinal sides of the stem 160. For example, the main damper 168 and isolation damper 170 may be at 12 o'clock and 5 or 7 o'clock, respectively.

The main damper 168 is secured in a first longitudinal slot 172 and the isolation damper 170 is secured in a second longitudinal slot 174. The main damper 168 is secured in the first slot 172 and the isolation damper 170 is secured in the second slot 174 using suitable means. For example, the main and isolation dampers 168 and 170, respectively, may be vulcanized into the first and second slots 172 and 174, respectively.

The isolation damper 170 is fabricated from a suitable material such as rubber and limits contact between the stem 160 and an interior surface 176 of the first bore 148A. When there is no brake loading, the isolation damper 170 creates a clearance or air gap 178 between the stem 160 and the interior surface 176 such that the stem 160 does not normally contact the interior surface 176.

Under a low pressure brake loading, the stem 160 seeks to displace or translate towards the interior surface 176. Stiffness of the isolation damper 170 initially prevents contact between the stem 160 and interior surface 176 while maintaining the clearance 178. As the brake loading increases and a compression threshold is reached, the isolation damper 170 will begin to compress. The clearance 178 reduces in size under the low pressure brake loading from that illustrated in FIG. 3A, although the stem 160 does not contact the interior surface 176.

Under an increased brake loading, the isolation damper 170 compresses such that the stem 160 makes contact with the interior surface 176 at a defined contact point, indicated generally at 180. A contact threshold at which the isolation damper 170 is sufficiently compressed that the stem 160 contacts the interior surface 176 may be tuned or adjusted. The contact threshold may be tuned by varying the stiffness and/or composition of the isolation damper 170. For example, the isolation damper 170 may be fabricated from plastic.

The defined contact point 180 may be defined by offsetting longitudinal axes of the first pin and first bore 112A and 148A, respectively. Alternatively, the defined contact point 180 may be defined by the isolation damper 170 having a lower stiffness than the main damper 168. Alternatively, the defined contact point 180 may be defined by having different relative stiffness between the main damper 168 and isolation dampers 170 allows the first pin and first bore 112A and 148A to have a common longitudinal axis—i.e., the axes X1 and X3 are the same.

As illustrated, the defined contact point 180 is defined at approximately a 6 o'clock position in the first bore 148. Alternatively, the defined contact position 180 may be defined at other than the 6 o'clock position. For example, the defined contact position may be defined at 3 o'clock or 9 o'clock positions in the first bore 148A, or any position between 3 o'clock and 9 o'clock.

Figure 4A:
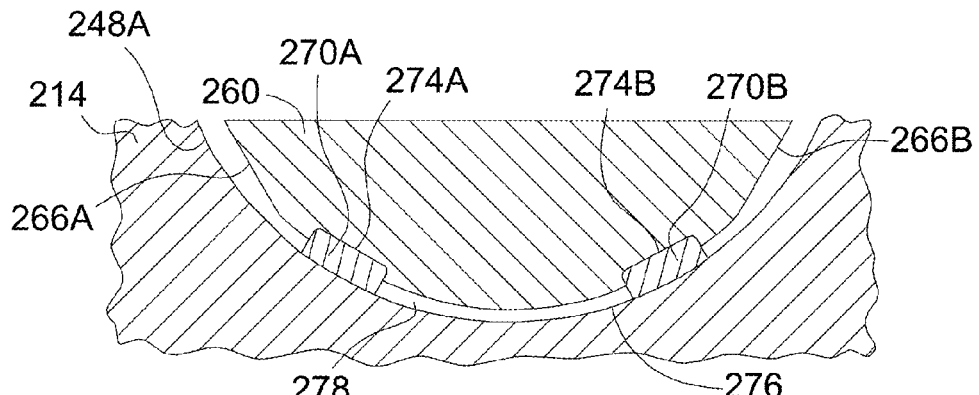
FIG. 4A is a partial sectional view of a guide pin in accordance with a second embodiment of the present invention.
Figure 4B:
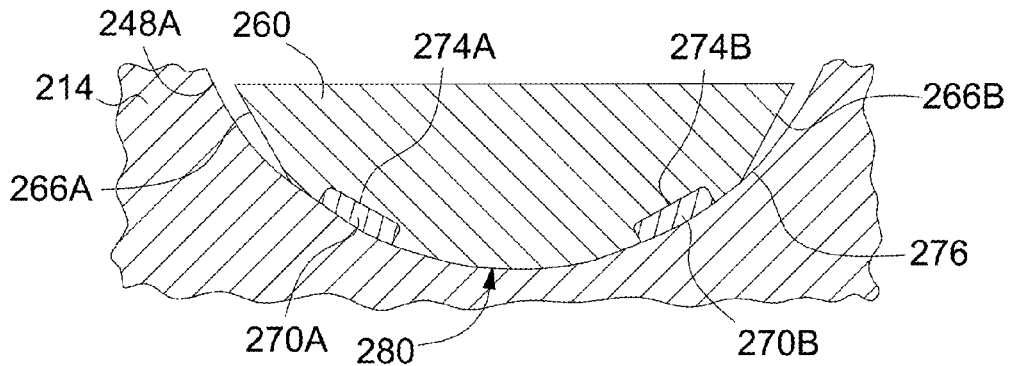
FIG. 4B is a partial sectional view of the guide pin of FIG. 4A in a braking position.

Referring now to FIGS. 4A and 4B, there is illustrated a second embodiment of a guide pin 212A, produced in accordance with the present invention. Because the guide pin 212A is a variation of the first guide pin 112A of FIGS. 1-3B, like reference numerals, increased by 100, designate corresponding parts in the drawings and detailed description thereof will be omitted.

The guide pin 212A has a stem 260 having first and second isolation dampers 270A and 270B, respectively. The first and second isolation dampers 270A and 270B, respectively, act together to create a clearance 278 and limit contact between the stem 260 an interior surface 176 of a bore 248A.

When a contact threshold is exceeded, the stem 260 contacts a bore 248A at a defined contact point, indicated generally at 280. The defined contact point 280 may be defined at least in part by varying stiffness between the first and second isolation dampers 270A and 270B, respectively. For example, to direct the defined contact point 280 closer to the first isolation damper 270A, the second isolation damper 270B may be stiffer than the first isolation damper 270A.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A disc brake assembly comprising:
   an anchor bracket having at least one bore formed therein;
   a guide pin configured to be slidably supported in the bore and having a stem;
   at least one main damper configured to be disposed between the stem and an interior surface of the bore and configured to bias a portion of the stem against the interior surface of the bore depending upon brake loading on the disc brake assembly; and
   at least one secondary damper configured to be disposed between the stem and the interior surface, wherein the secondary damper is configured to limit a contact between the stem and the interior surface depending upon the brake loading on the disc brake assembly;
   wherein the secondary damper has a contact threshold and, when a brake loading exceeds the contact threshold, the secondary damper allows contact between the stem and the interior surface.

2. The disc brake assembly of claim 1 wherein the secondary damper has a compression threshold and, when a brake loading exceeds the compression threshold, the secondary damper is compressed.

3. The disc brake assembly of claim 1 wherein the secondary damper has a stiffness, and the stiffness is adjusted to set compression and contact thresholds.

4. The disc brake assembly of claim 1 wherein the secondary damper is opposite the main damper.

5. The disc brake assembly of claim 1 wherein the secondary damper limits contact between the stem and the interior surface during brake loading on the disc brake assembly.

6. The disc brake assembly of claim 1 wherein the secondary damper limits contact between the stem and the interior surface without brake loading on the disc brake assembly.

7. The disc brake assembly of claim 1 wherein the secondary damper holds the main damper against the interior surface.

8. The disc brake assembly of claim 1 wherein the secondary damper has a lower stiffness than the main damper and the pin and the bore have a common longitudinal axis.

9. The disc brake assembly of claim 1 further comprising:
   a further secondary damper is configured to be disposed between the stem and the interior surface, wherein the two secondary dampers together limit contact between the stem and the interior surface.

10. The disc brake assembly of claim 1 further comprising:
    a brake caliper secured to the guide pin; and
    inboard and outboard brake shoes supported on the anchor bracket by clips.

11. A disc brake assembly comprising:
    an anchor bracket having at least one bore formed therein;
    a guide pin configured to be slidably supported in the bore and having a stem;
    at least one main damper configured to be disposed between the stem and an interior surface of the bore and configured to bias a portion of the stem against the interior surface of the bore depending upon brake loading on the disc brake assembly; and
    at least one secondary damper configured to be disposed between the stem and the interior surface;
    wherein a clearance exists between the stem and the interior surface of the bore when there is no brake loading on the disc brake assembly and as brake loading increases, the secondary damper is compressed until the clearance is closed and a portion of the stem contacts the interior surface.

12. The disc brake assembly of claim 11 wherein the secondary damper does not compress until a compression threshold is exceeded.

13. The disc brake assembly of claim 11 wherein the stem contacts the inner surface at a defined contact point.

14. The disc brake assembly of claim 11 wherein the main damper and the secondary damper are located on opposite longitudinal sides of the stem.

15. The disc brake assembly of claim 11 further comprising:
a further secondary damper is configured to be disposed between the stem and the interior surface, wherein the two secondary dampers together limit contact between the stem and the interior surface.

16. The disc brake assembly of claim 11 further comprising:
a brake caliper secured to the guide pin; and
inboard and outboard brake shoes supported on the anchor bracket by clips.

17. A disc brake assembly comprising:
an anchor bracket having at least one bore formed therein;
a guide pin configured to be slidably supported in the bore and having a stem;
at least one main damper configured to be disposed between the stem and an interior surface of the bore and configured to bias a portion of the stem against the interior surface of the bore depending upon brake loading on the disc brake assembly; and
at least one secondary damper configured to be disposed between the stem and the interior surface, wherein the secondary damper is configured to limit a contact between the stem and the interior surface depending upon the brake loading on the disc brake assembly;
wherein the secondary damper has a contact threshold and, when a brake loading exceeds the contact threshold, the secondary damper allows contact between the stem and the interior surface; and
wherein contact between the stem and the interior surface is at a defined contact point.

\* \* \* \* \*